United States Patent [19]
Kocberber

[11] Patent Number: 5,740,342
[45] Date of Patent: Apr. 14, 1998

[54] METHOD FOR GENERATING A THREE-DIMENSIONAL, LOCALLY-UNSTRUCTURED HYBRID GRID FOR SLOPING FAULTS

[75] Inventor: Sait Kocberber, Houston, Tex.

[73] Assignee: Western Atlas International, Inc., Houston, Tex.

[21] Appl. No.: 417,643

[22] Filed: Apr. 5, 1995

[51] Int. Cl.⁶ .................................................. G06T 17/50
[52] U.S. Cl. ........................................................ 395/120
[58] Field of Search ................................. 395/119, 123, 395/124, 141; 367/68–73; 364/420–422

[56] References Cited

U.S. PATENT DOCUMENTS

| | | | |
|---|---|---|---|
| 4,775,946 | 10/1988 | Anjyo | 395/119 |
| 5,261,029 | 11/1993 | Abi-Ezzi | 395/119 |
| 5,553,206 | 9/1996 | Meshkat | 395/119 |

OTHER PUBLICATIONS

Kocberber, Sait: "An Automatic Unstructured Grid Generation System for Geologically Complex Reservoirs" (SPE 28245); Jul. 31, 1994.

Kocberber, Sait: "The Modeling of Deviated Wells and Sloping Faults With Locally Unstructured Grids: Part 1–Gridding Aspects" (SPE 26506); Oct. 3, 1993.

Kocberber, Sait; "A Finite–Element Black Oil Simulation System for Heterogeneous Reservoirs With Horizontal Wells Having Vertical Hydraulic Fractures" (SPE 25269); Feb. 28, 1993.

Aziz, Khalid; "Reservoir Simulation Grids: Opportunities and Problems" (SPE 25233); Feb. 28, 1993.

Bowyer, A.; "ComputingDirichlet tesselations" (*The Computer Journal*, vol. 24, No. 2, pp. 162–166); 1981.

Watson, D. F.; "Computing the n–dimensional Delaunay tessellation with application to Voronoi polytopes" (The Computer Journal, vol. 24, No. 2, pp. 167–172); 1981.

Cavendish, James C.; Field, David A. and Frey, William H.; "An Approach to Automatic Three–Dimensional Finite Element Mesh Generation" (*International Journal for Numerical Methods in Engineering*, vol. 21, pp. 329–347); 1985.

Schroeder, W.J. and Shephard, M.S.; "A Combined Octree/Delaunay Method for Fully Automatic 3–D Mesh Generation" (*International Journal for Numerical Methods in Engineering*, vol. 29, pp. 37–55); 1990.

Mavriplis, Dimitri J.; "Adaptive Mesh Generation for Viscous Flows Using Delaunay Triangulation" (Journal of Computational Physics, vol. 90, No. 2, pp. 271–291); 1990.

Rebay, S.; "Efficient Unstructured Mesh Generation by Means of Delaunay Triangulation and Bowyer–Watson Algorithm" (*Journal of Computational Physics*, vol. 106, pp. 125–138); 1993.

(List continued on next page.)

Primary Examiner—Anton W. Fetting
Attorney, Agent, or Firm—Charles R. Schweppe

[57] ABSTRACT

A method of generating an automatic, three-dimensional, locally-unstructured, hybrid grid for geological formations with a sloping fault. The grid generation system replaces the portion of an existing finite-difference grid around the sloping fault with a finite-element grid made of triangular prisms and tetrahedrons. The process comprises decomposing the part of the reservoir around the sloping fault into topologically and geometrically simple volume, face and line components, generating a wire-frame construction of the domain by discretization of the line components, calculating the exact crossings of horizons with the fault, generating a finite-element grid for the face components using an automatic triangulation process, generating a finite-element grid for the volume elements using an automatic tetrahedronization process and assembling the finite-element grid for all volume elements and the finite-difference grid to create a locally-unstructured hybrid grid with enhanced detail around the sloping fault.

9 Claims, 17 Drawing Sheets

OTHER PUBLICATIONS

Lo, S.H.; "A New Mesh Generation Scheme for Arbitrary Planar Domains" (*International Journal for Numerical Methods in Engineering*, vol. 21, pp. 1403–1426); 1985.

Jin, H. and Wiberg, N.-E.; "Two–Dimensional Mesh Generation, Adaptive Remeshing and Refinement" (*International Journal for Numerical Methods in Engineering*, vol. 29, pp. 1501–1526); 1990.

Peraire, J.; Peiro, J. and Morgan, K.; "Adaptive Remeshing for Three–Dimensional Compressible Flow Computations" (*Journal of Computational Physics*, vol. 103, pp. 269–285); 1992.

Jin, H. and Tanner, R.I.; "Generation of Unstructured Tetrahedral Meshes by Advancing Front Technique" (*International Journal for Numerical Methods in Engineering*, vol. 36, pp. 1805–1823; 1993.

$$\alpha = \frac{r_i}{r_o}$$

METHOD FOR GENERATING A THREE-DIMENSIONAL, LOCALLY-UNSTRUCTURED HYBRID GRID FOR SLOPING FAULTS

BACKGROUND OF THE INVENTION

1. Field of the Invention

This invention relates generally to the field of simulated perspective modeling and more particularly to a method of three-dimensional seismic reservoir geometry characterization.

2. Description of the Related Art

To accurately predict the flow of hydrocarbons, such as oil and gas, through subterranean formations and to determine efficient recovery techniques, a reservoir simulation model is used. An integral, and often time-consuming, part of building a reservoir simulation model is the imposition of a grid of discrete nodes on the reservoir to facilitate the solution of flow equations by calculating the transmissibilities among the nodes.

Recent technological advances in three-dimensional geological and geophysical tools enable greater precision in the quantification of petroleum reserves and in the description of complex geological features such as sloping faults, scissors faults and reverse faults. With these tools, the extent and location of layers and faults can be determined and heterogeneous internal architecture of reservoirs can be constructed more accurately.

Unfortunately, prior art reservoir simulation technology has not kept pace and does not take full advantage of these technological developments. Reservoir simulation gridding technology has been considered lacking in its ability to represent the increased geological realism now desired in reservoir models.

Historically, reservoir simulation grids have been based on projections of areal grids with an areal coordinate transformation employed to divide the reservoir into an array of topologically rectangular grid blocks. This method is semi-automatic and produces structured grids. Because of their logically rectangular structure, however, these grids do not have the flexibility to conform to reservoir geometry and heterogeneity configurations.

Flaws in these systems, therefore, become apparent when the reservoir contains complex geological formations such as sloping faults. The prior art grid generation systems can only represent geometrical features of the reservoir that coincide with grid lines. The rectangularly-structured grids are unable to align with complex geology such as the sloping faults. Furthermore, the prior art methods replace the horizon-fault-horizon sequence with a single surface and project the grid vertically. Therefore, the layer offsets across the fault become distorted. This distortion is promulgated as a continuity of the layers with fluid communication of the layers across the fault. The false modeling of continuities generates information subject to significant uncertainty.

To overcome the lack of proper detailing of the complex geophysical properties of faults, completely unstructured grids can be assembled that assume almost any shape. Although three-dimensional, unstructured grid generation techniques, such as automatic tetrahedronization used by the aerospace and manufacturing industries, may be able to generate detailed grids of complex reservoirs, the commercial usefulness of these techniques is questionable due to the size and complexity of reservoir simulation problems and the higher cost of solution techniques for unstructured grids as compared to structured grids. For example, it may take one hour to simulate on a fully structured finite difference grid and twenty-four hours to simulate on a fully unstructured finite element grid for the same flow process. This dramatic increase in the computing time greatly increases the cost and thereby lessens the desirability. Likewise, the use of manual enhancement techniques for the areas around the sloping faults is prohibitively expensive due to time and cost factors and the techniques are prone to human error. Therefore, a new automated, three-dimensional, locally-unstructured, hybrid grid generation system is needed.

SUMMARY OF THE INVENTION

The present invention is a method for automatically generating a finite-element grid around a sloping fault where the finite-difference grid does not accurately represent the topology and geometry of the reservoir and combining this finite-element grid with the remaining finite-difference grid to form a hybrid grid that facilitates efficient solution of flow equations for the reservoir.

A finite-difference grid is created with prior art simulator technology. The exact locations of the intersections of the fault with geological layers are determined and the blocks of the finite-difference grid around the sloping fault are deleted. The domain around the fault is decomposed into topologically and geometrically simpler units. The regions around the fault then are regridded through automatic tetrahedronization to accurately represent the fault while honoring the internal discontinuities in the triangulation and tetrahedronization processes. The resulting grid has selective refinement only where necessary to accurately represent the topology and geometry of the fault. Since the grid is unstructured only around the fault, efficient numerical solution of the grid is facilitated.

Examples of the more important features of the invention thus have been summarized rather broadly in order that the detailed description that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which the like elements have been given like numerals and wherein.

DETAILED DESCRIPTION OF THE PREFERRED EMBODIMENT

The present invention is a method for generating a grid for a reservoir containing complex structures such as a sloping fault. The following description of the preferred embodiment discusses a reservoir with a single sloping fault. This is meant by way of example and uses a simplified reservoir to facilitate the understanding of the invention and is not meant to limit the scope of the invention. Additional faults can be integrated into the grid.

Figure 1:
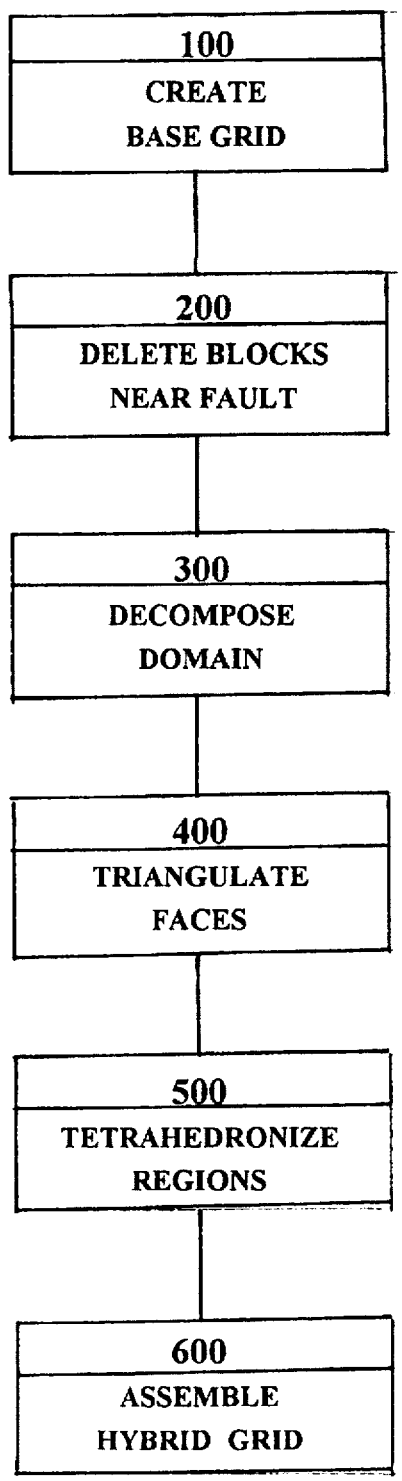
FIG. 1 is a flow chart of the method of the present invention.

The preferred embodiment of the grid-generation process, as shown by the flow diagram in FIG. 1, creates a base finite-difference grid from the reservoir descriptors (100), removes the finite-difference grid blocks which are close to the fault (200), decomposes the domain around the fault (300), triangulates the faces (400), tetrahedronizes the regions (500) and assembles a hybrid grid (600) which represents a three-dimensional model of the reservoir with enhanced imagery of the complex area surrounding the fault. The model, composed of discrete nodes, lines, faces and regions, can be displayed, printed or plotted for use by the reservoir engineer and can be input into a reservoir simulator to determine the flow characteristics of the reservoir. Each of these operations (100, 200, 300, 400, 500 and 600) is described in detail below.

Base Grid Creation (100)

Measurements are taken of the various geological and geophysical characteristics of the reservoir using well-known measurement tools. These reservoir descriptors include the same information used by finite-difference grid generators commonly used in the industry, namely, the identification of the physical boundaries of the reservoir and the description of each fault and each horizon (one of the surfaces separating the various geological layers) that constitute the geological model.

Typically, the horizon and fault information is provided on an areal Cartesian grid (such as in the prior art) with the depth to each horizon and each fault surface provided at each node. Alternatively, the description of the horizons and faults can be input as a set of randomly distributed locations in space. The system then generates a triangulation of the nodes and the horizon and fault data is represented on a triangular grid with depth given at each node. The topological information of the geological model that describes the relative location of the horizons and faults with respect to each other is also required.

Additional data such as well location information (including the exact locations of intervals that are perforated or otherwise communicating with the reservoir) can be entered and processed to provide information on the flow characteristics of the reservoir.

Figure 2:
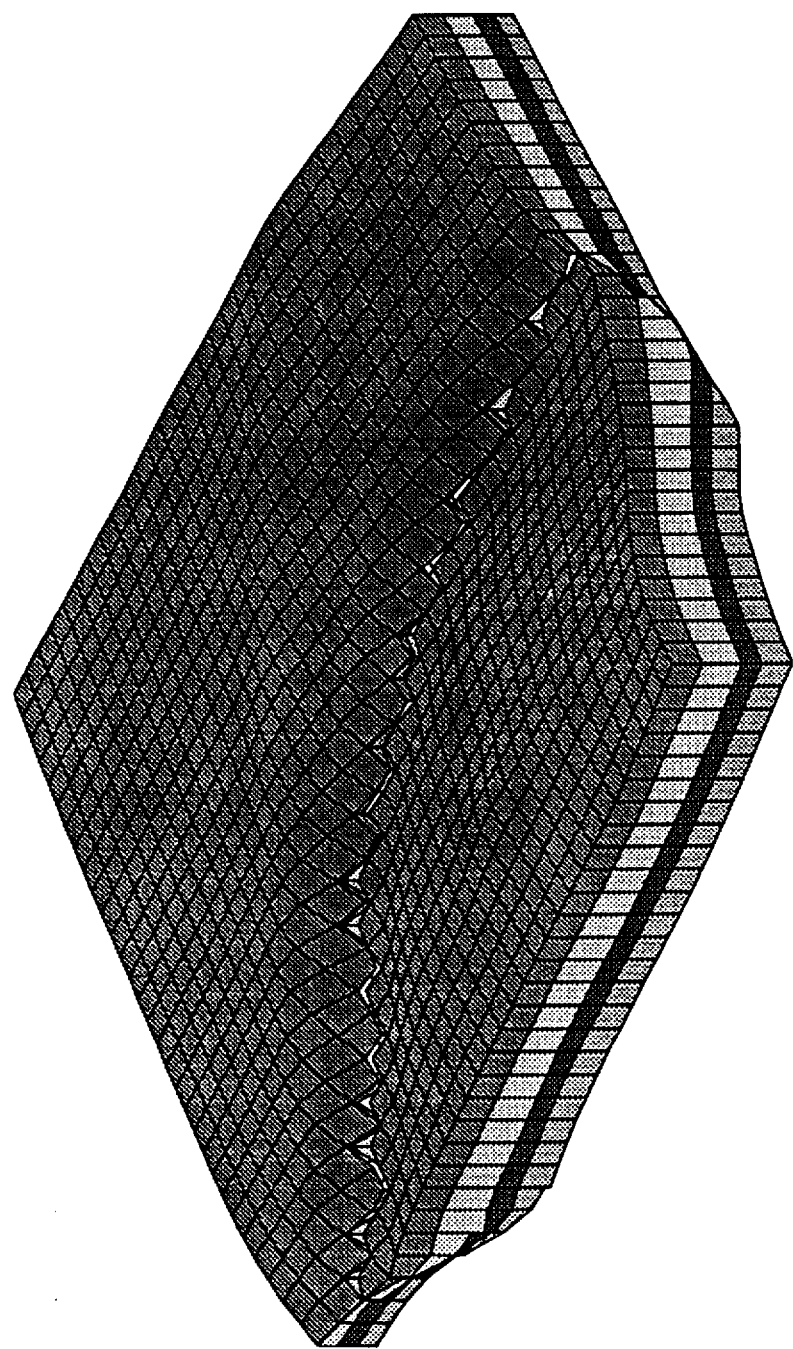
FIG. 2 is a perspective view of a finite-difference grid for a reservoir with a sloping fault.

A base grid, shown in FIG. 2, is created for the reservoir using one of the prior art finite-difference grid generators which are well-known in the industry. The grid is a curvilinear Cartesian grid $N_x$ by $N_y$ by $N_z$. The base grid links the corner point geometry of each Cartesian grid block.

Figure 3A:
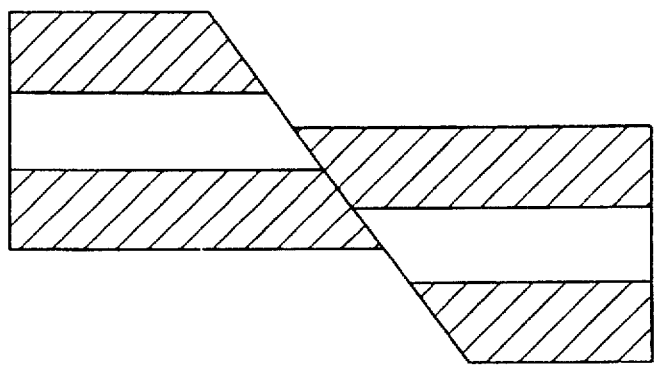
FIG. 3A is a cross-sectional view of a reservoir near a sloping fault.
Figure 3B:
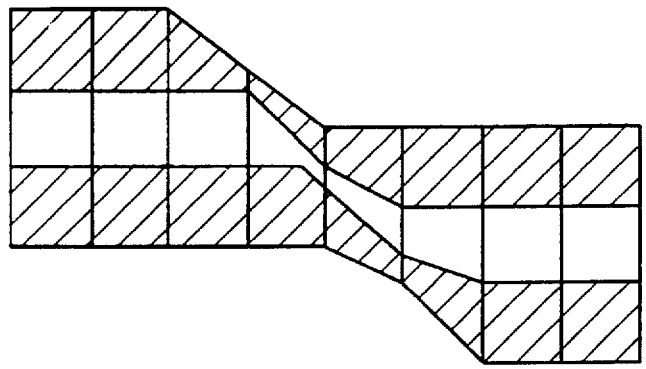
FIG. 3B is a cross-sectional view of a finite-difference grid of the reservoir shown in FIG. 3A.
Figure 3C:
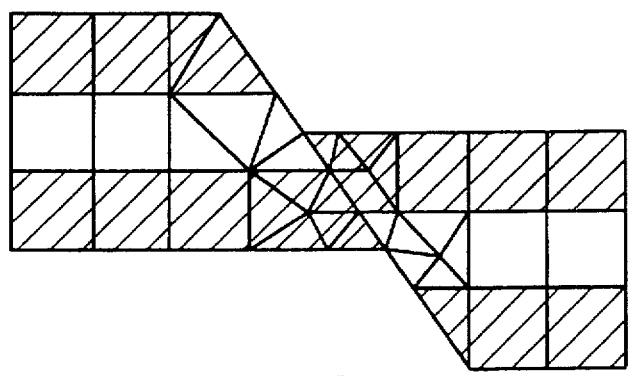
FIG. 3C is a cross-sectional view of a hybrid grid of the reservoir shown in FIG. 3A.

FIG. 3A illustrates the geometry of a reservoir with a sloping fault. FIG. 3B is the same cross-sectional view of the reservoir shown in FIG. 3A after the finite-difference grid blocks have been generated. The finite-difference grid blocks located near the sloping fault, as shown in FIG. 3B, are distorted. The blocks do not represent the actual geometry and topology of the reservoir and demonstrate the limitations of the finite-difference grids of the prior art. In contrast to the distorted blocks in FIG. 3B, the area near the sloping fault in a hybrid grid, as shown in FIG. 3C and as described below, is geometrically and topologically accurate.

Block Deletion (200)

Figure 4:
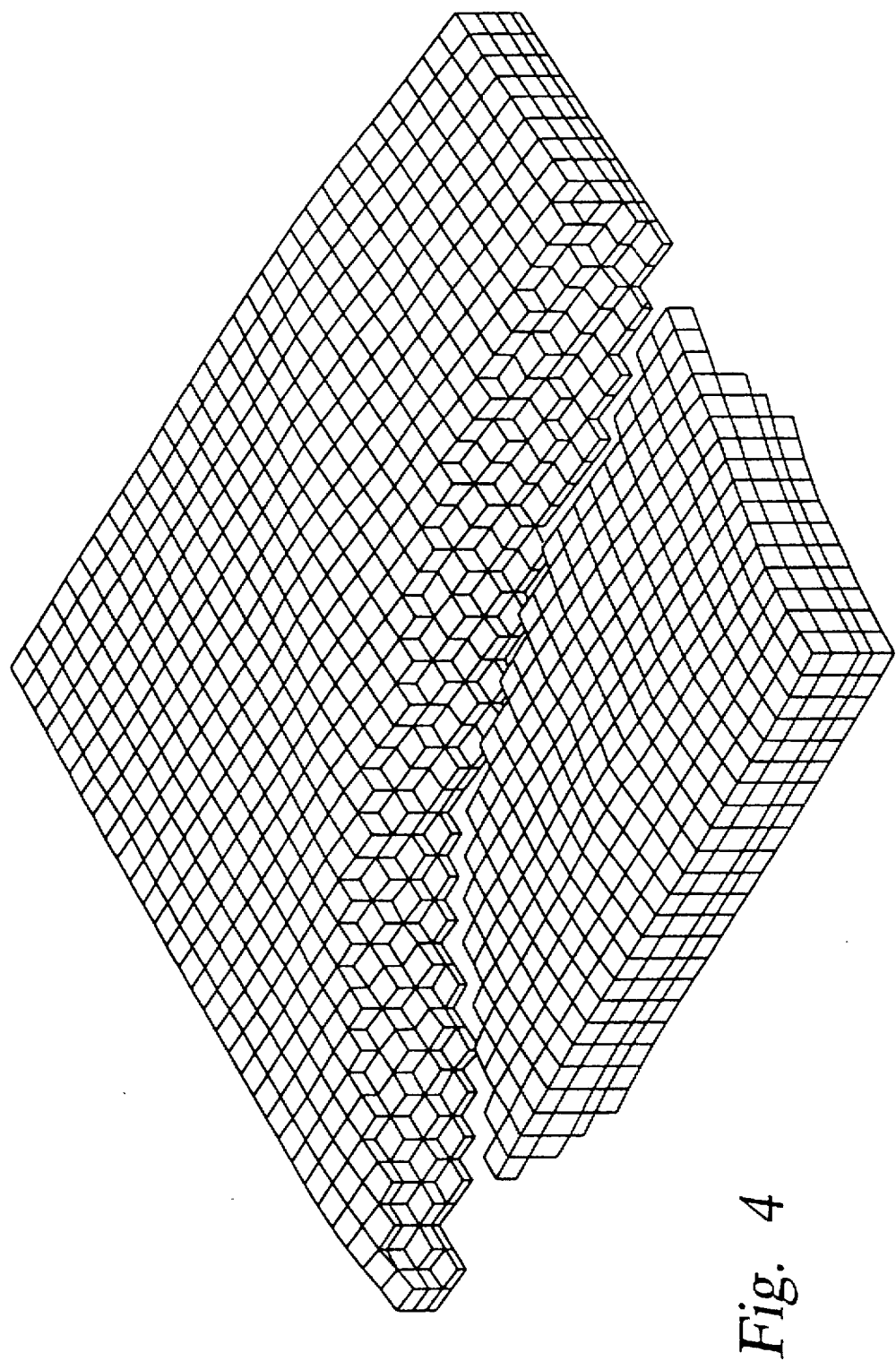
FIG. 4 is a perspective illustration of the FIG. 2 finite-difference grid after deletion of selected blocks.

Because the areas directly adjacent to the fault are not rectangular and cannot be represented accurately by rectangular coordinates, the distorted finite difference grid blocks for these areas are removed. All finite-difference grid blocks that either cross the fault or are "too close" to the fault are deleted. A block is determined to be "too close" if it is separated from the fault by less than ten percent of a grid increment. Ten percent is meant by way of example and is not meant to limit the scope of the invention. FIG. 4 shows a perspective view of the remaining finite-difference grid blocks that will be combined with the finite-element grid, as described below.

Domain Decomposition (300)

The area from which the finite-difference grid blocks were removed (the area surrounding the sloping fault) is known as the domain. The domain is sub-divided into $N_r$ regions with simpler topology and geometry than the total domain to facilitate processing. There is one region for each layer on each side of the sloping fault. For the domain illustrated by the missing grid blocks in FIG. 4, $N_r$ is eight (4 layers×2 sides of the fault=8 regions). A region is defined as the portion of a layer surrounded by the grid boundary, the finite-difference grid and the fault and is identified by discrete faces, lines and nodes.

The boundary (surface) of each region is divided into $N_f$ faces. Because there is only one fault in this reservoir, $N_f$ has the value of six (top, bottom, left side, right side, front, back) for all regions except one. One of the top regions has five faces due to a pinchout (the top and bottom faces merge and, therefore, there is no left face). These faces are identified by the sides of the remaining finite-difference grid blocks, the sloping fault, the top and bottom horizons for the layer and the side boundaries of the grid.

Figure 11A:
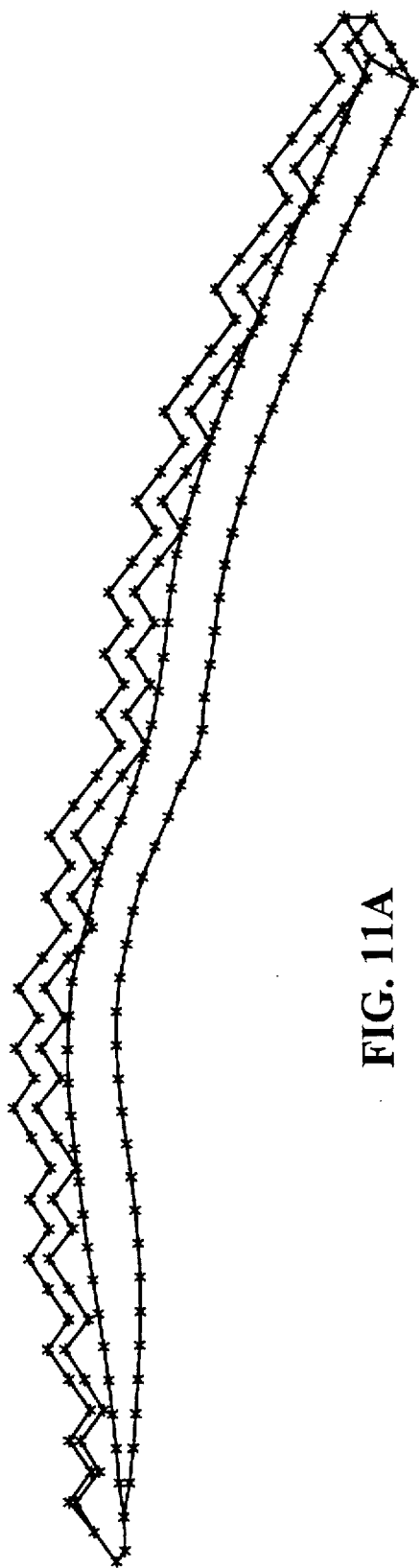
FIGS. 11A–D illustrate four stages of tetrahedronization of a region.

The region with the five faces is illustrated in FIG. 11A. This region (top layer on back side of the fault) is one of the eight regions for the domain illustrated in FIG. 4. The five faces of this region are: the top horizon (top), the next horizon (bottom), the right boundary of the reservoir (right side), the sloping fault (front) and the remaining finite-difference grid blocks closest to the fault (back).

The boundary of each face is divided into $N_l$ lines. The faces also can contain internal lines that act as constraints. Lines are represented by a set of nodes. The internal node distribution for each face is obtained through automatic triangulation of the face subject to the constraint that each node lies on the face as defined in the input data. For all faces, $N_1$ is equal to four. These lines are identified by the horizon traces, the trace of the remaining finite-difference grid blocks and the grid boundaries.

Nodes are generated along all lines. The node-spacing along the lines which match the remaining portion of the finite-difference grid is forced to match the node-spacing of the finite-difference grid. For all other lines, the node-spacing is set to be sixty percent of average grid size.

Figure 5:
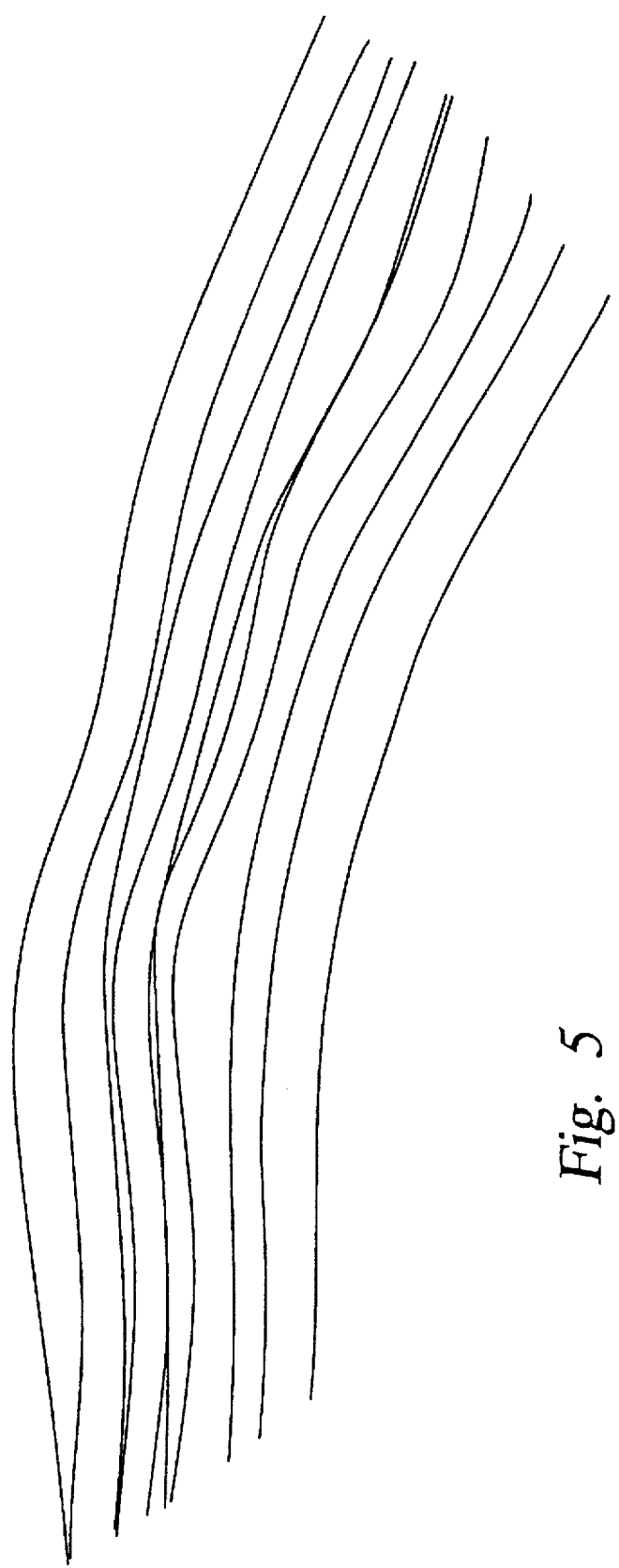
FIG. 5 illustrates the horizon traces on the fault surface.

Horizon traces on the fault are calculated by determining the intersection of the horizons with the fault. In the present example, there are five horizons (the top of the first layer plus the bottom of each of the four layers) on each side of the fault. Therefore, ten horizon traces (five horizons×two sides of the fault) are calculated and are illustrated in FIG. 5.

Figure 6:
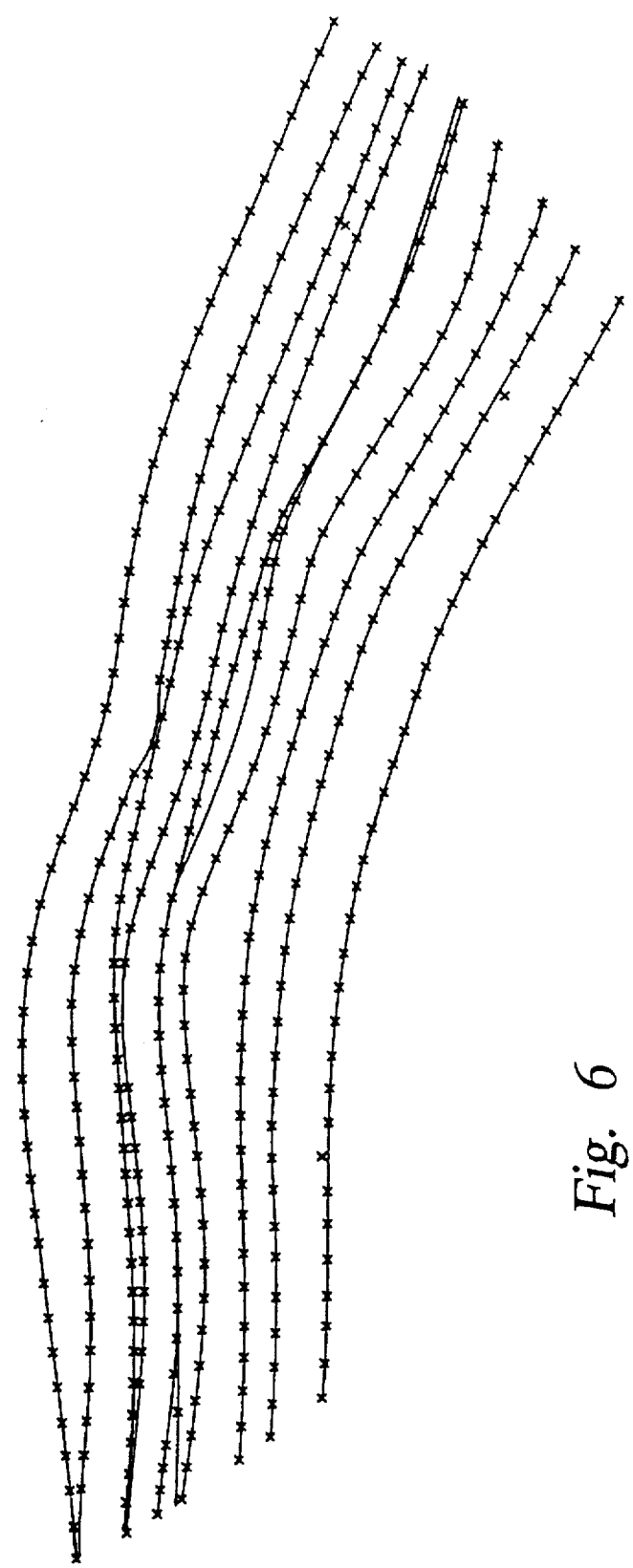
FIG. 6 shows the node distribution along the horizon traces of FIG. 5.

When two horizon traces from opposite sides of the fault are "excessively close" to each other, they are approximated by a single curve. "Excessively close" in the preferred embodiment is defined to be within ten percent of a grid increment. This is meant by way of example and is not meant to exclude other thresholds which may be selected. Nodes then are generated, as shown in FIG. 6, along the horizon traces with a spacing of sixty percent of the average size of the grid blocks.

Figure 7:
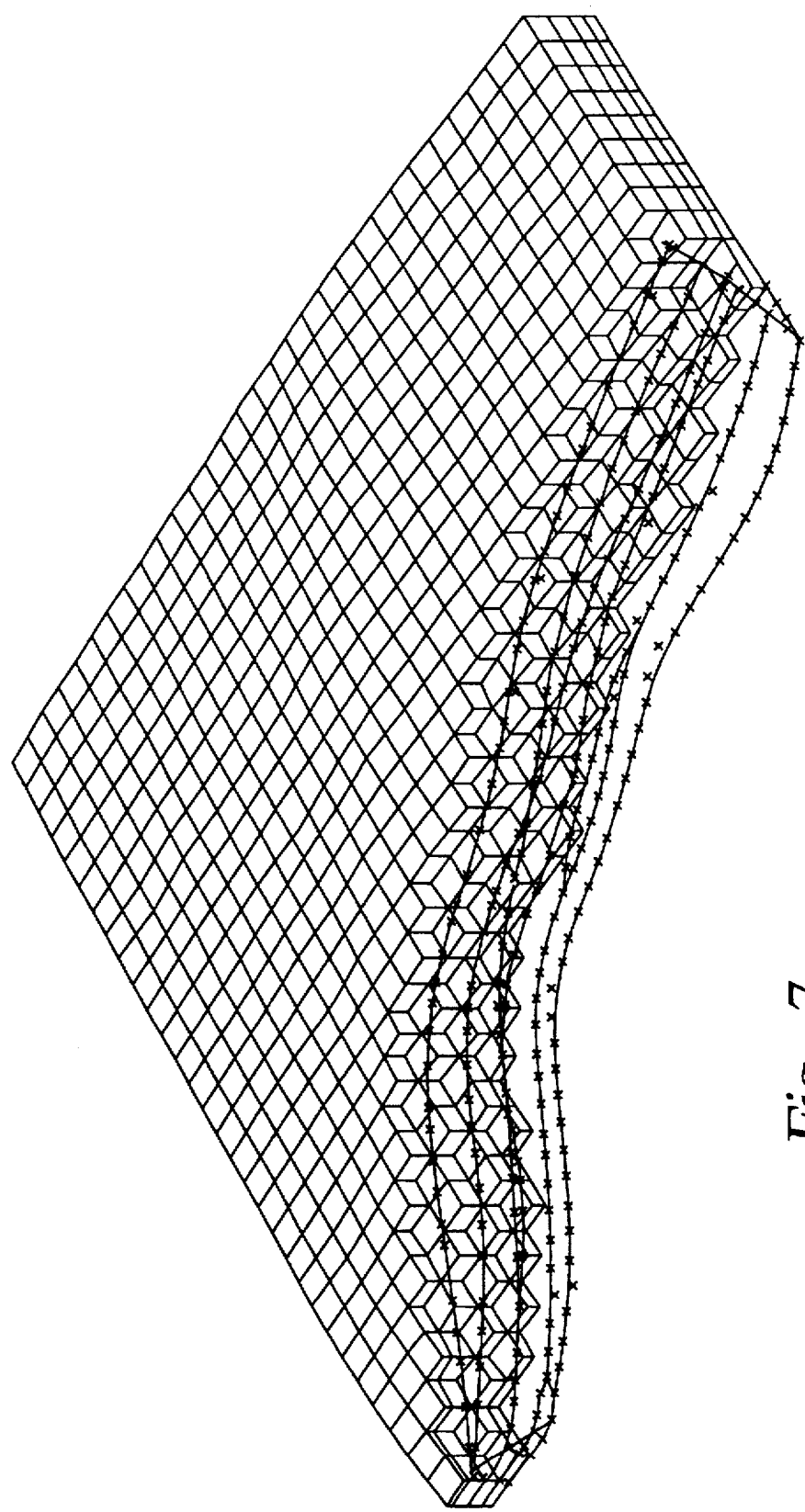
FIG. 7 is a wire-frame representation of the up-thrust regions.

The horizon traces from opposite sides of the fault create a constraint on region geometries and are included in the wire-frame construction shown in FIG. 7. Similarly, finite-difference grid blocks that may exist on the top or the bottom of each region also create a constraint on region geometries and, therefore, are included in the wire-frame construction.

At the end of this domain decomposition process, the topology and geometry of the domain is implicitly defined in terms of regions, faces, lines and nodes. By sub-dividing the three-dimensional domain into this type of data structure, the elements are uniquely identifiable. For example, the faces contained in a certain region can easily be identified as can the lines bounding a face. Because common interfaces are represented by identical components, they have identical grids.

Triangulation of Faces (400)

The next operation 400 is the representation of the faces by a finite-element grid. This is done by triangulation of the faces which were identified in the domain decomposition operation 300. The following discussion of the fundamental properties of finite-element grids will facilitate the understanding of the present invention.

Figure 8:
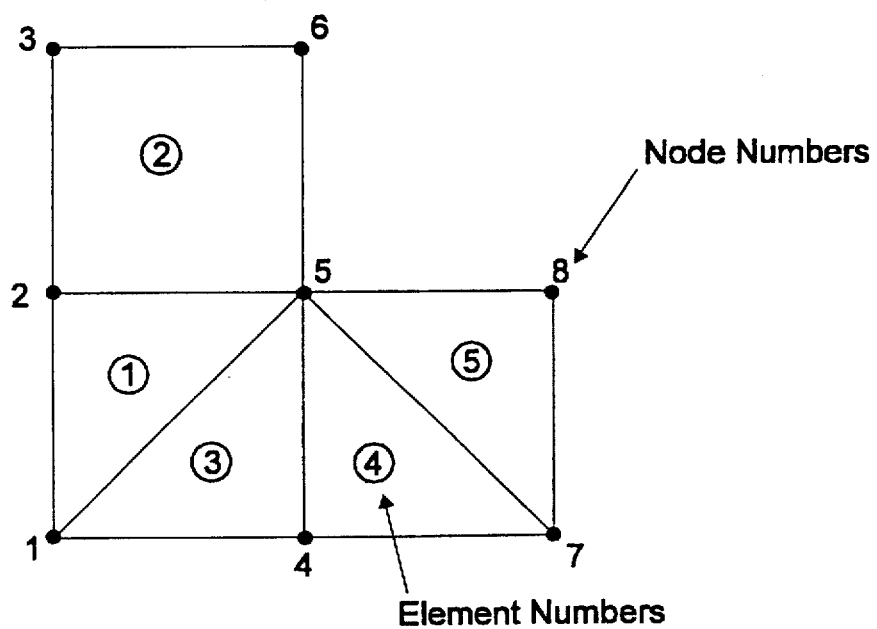
FIG. 8 is an example of a two-dimensional finite-element grid.

A finite-element grid is made of nodes and elements. A sample two-dimensional grid for an L-shaped domain is shown in FIG. 8. This grid contains eight nodes and five elements. The second element has four nodes while the other elements each have three nodes. For a complete description of the grid, the nodal and element information needs to be specified. The nodal information constitutes the total number of nodes and their locations. The element information constitutes the total number of elements, the number of nodes in each element, the rock type of each element and the counterclockwise order of the nodes in each element. For example, the third element in FIG. 8 has three nodes numbered 1, 4 and 5 respectively. This data structure completely describes the grid. A corner point geometry grid can easily be constructed from this grid, and vice versa.

The elements do not overlap and they completely cover the domain within a certain precision. The grid geometrically resembles the domain it represents and is topologically consistent with the domain. For example, the L-shaped grid of FIG. 8 is part of the L-shaped domain. The grid would not be topologically consistent with the L-shaped domain if it included another triangular element with nodes 5, 8 and 6.

Two-dimensional grids are made of line segments. Each triangle has three lines and each square has four lines. Each line segment on the boundary is contained in only one element. For example, the line segment between nodes 7 and 8 is only in the fifth element. Each interior line segment is shared by exactly two elements. The line segment between nodes 1 and 5, for example, is shared by the first and third elements. A similar property exists for three-dimensional grids where the line segments are replaced by faces.

Figure 9:
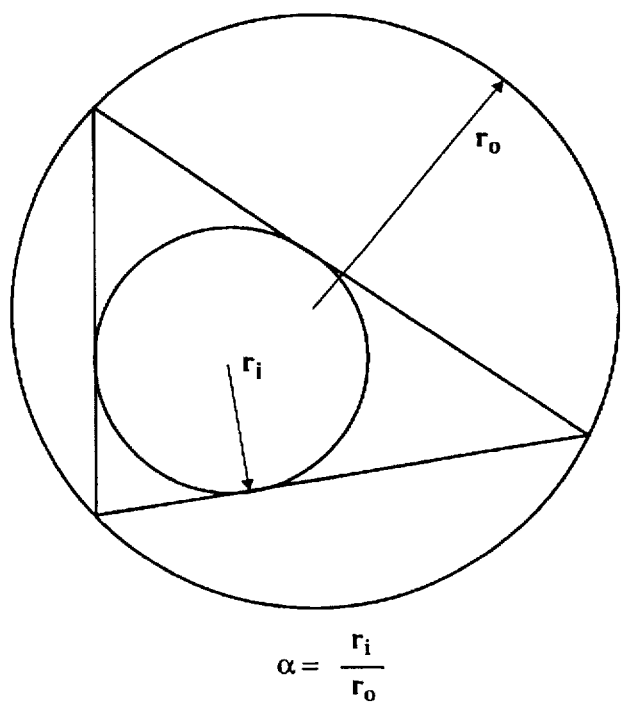
FIG. 9 illustrates the aspect ratio of a triangle.

The quality of a triangular element directly influences the accuracy of the flow characteristic calculations. The quality of a triangular element is defined by the aspect ratio $\propto$:

$$\propto = r_i/r_o \tag{1}$$

where $r_i$ is the radius of the inscribed circle of the triangle and $r_o$ is the radius of the circumscribed circle of the triangle, as shown in FIG. 9 The aspect ratio for tetrahedral elements is similarly defined as the ratio of the radius of the inscribed sphere of the tetrahedron to the radius of the circumscribed sphere of the tetrahedron.

The triangular element with the highest quality is an equilateral triangle with an aspect ratio of 0.5. Similarly, the best tetrahedral element is an equilateral tetrahedron with an aspect ratio of ⅓. Conversely, elements with obtuse angles have lower aspect ratios and should be avoided because they yield inaccurate numerical solutions. A grid composed mostly of elements that have high aspect ratios provides more accurate results than one using elements with low aspect ratios. If the grid were totally composed of equilateral triangles and tetrahedrons, however, the grid would be structured and would lose flexibility in filling regions of arbitrary shape. Therefore, a balancing is done between using elements with the highest aspect ratios and using elements having the greatest flexibility to fill non-uniform areas.

Given a set of points in n dimensions, non-overlapping n-dimensional triangles can be constructed by Delaunay triangulation which is well-known in the industry. The geometric version of this process is known as the Dirichlet tesslation. It is constructed by associating with each point, the part of the domain which is nearer to that point, in terms of Euclidean distances, than to any other point in the domain. This process divides the domain into non-overlapping convex polygons around the points. If the point pairs whose regions have a face in common are joined by straight line segments, the domain is divided into non-overlapping n-dimensional triangles. Delaunay triangulation obeys the circumsphere property, which states that no vertex from any triangle may lie within the n-dimensional circumsphere of any other triangle.

Because the generation of properly distributed grid points is the most difficult aspect of automatic grid generation, Delaunay triangulation is of limited use by itself. Therefore, the present invention uses the Delaunay triangulation in combination with the advancing front technique to handle the complex geometry of reservoirs with internal discontinuities (such as sloping faults). The triangles and tetrahedrons are generated by the advancing front technique and the circumsphere property of Delaunay triangulation is used to select the optimum triangle or tetrahedron.

The advancing front technique is another method of automatic generation of unstructured triangles. This technique was first introduced by Lo for triangulation of planar domains in which he introduced nodal point distribution a priori. First, a triangulation front is generated, consisting only of the boundary line segments. All nodal points are searched one by one and an optimum triangle is selected. The generation front is updated continuously as new triangles are created. Each created triangle can increase the generation front by two line segments. In the final grid, each boundary segment is contained in only one element and each interior segment is contained in exactly two elements. Therefore, the creating of each new triangle also can decrease the generation front by up to three segments. When the generation front becomes empty, the triangulation is completed. The technique has been extended such that triangles, tetrahedrons and nodes are created simultaneously.

Before the triangulation process, line segments are generated along each line. A line segment is the part of the line located between two consecutive nodes. In the preferred embodiment, the nodes in all line segments are ordered such that the domain to be triangulated is always situated to the left of the line segments. A triangle generation front made of all exterior line segments then is created. The line segments in the generation front are sorted in the order of increasing length. The first (or next) segment in the generation front is used as a base to find a location on the background surface such that an equilateral triangle with nodes ordered counterclockwise is created. This equilateral triangle is called a primary candidate triangle and the location that is found is a primary candidate node.

A heap list then is made of all existing nodes located to the left of the base and within a radius of twice the size of the average grid size of the primary candidate node. The nodes in the heap list are secondary candidate nodes and the triangles they make with the base are secondary candidate triangles. The heap list is ordered in the order of decreasing aspect ratio (the ratio of the radius of the inscribed circle of the triangle to that of the circumscribed circle of the triangle).

If any of the following tests is true for the primary candidate, the primary candidate node is abandoned and the secondary candidate nodes are considered in descending order (the secondary candidate node being considered becomes the primary candidate node): the primary candidate node is within a specified distance of the secondary candidate nodes or the active generation front (the specified distance is equal to fifty percent of the average grid size); the line segments between the primary candidate node and the base nodes cross an exterior boundary or internal constraints; or a secondary candidate node is inside the circumcircle of the primary candidate triangle. If the tests are all false for the candidate, the candidate is selected as the third node of the triangle. If no candidate is selected as the third node of the triangle, the next line segment in the generation front is considered and the process is repeated.

The selected node (primary or secondary candidate as described above) is used as the third node to create a new triangle. The base line segment is removed from the active generation front and two potential new line segments are considered: the line segment from the third node to the second node and the line segment from the first node to the third node of the new triangle. If a new line segment matches an existing line segment, the matching segment is removed from the generation front. Otherwise, the new line segment is added to the generation front.

When the generation front becomes empty upon removal of a line segment, triangulation is completed. If the generation front is not empty, it is resorted and the next line segment in the generation front is considered and the process is repeated.

Figure 10:
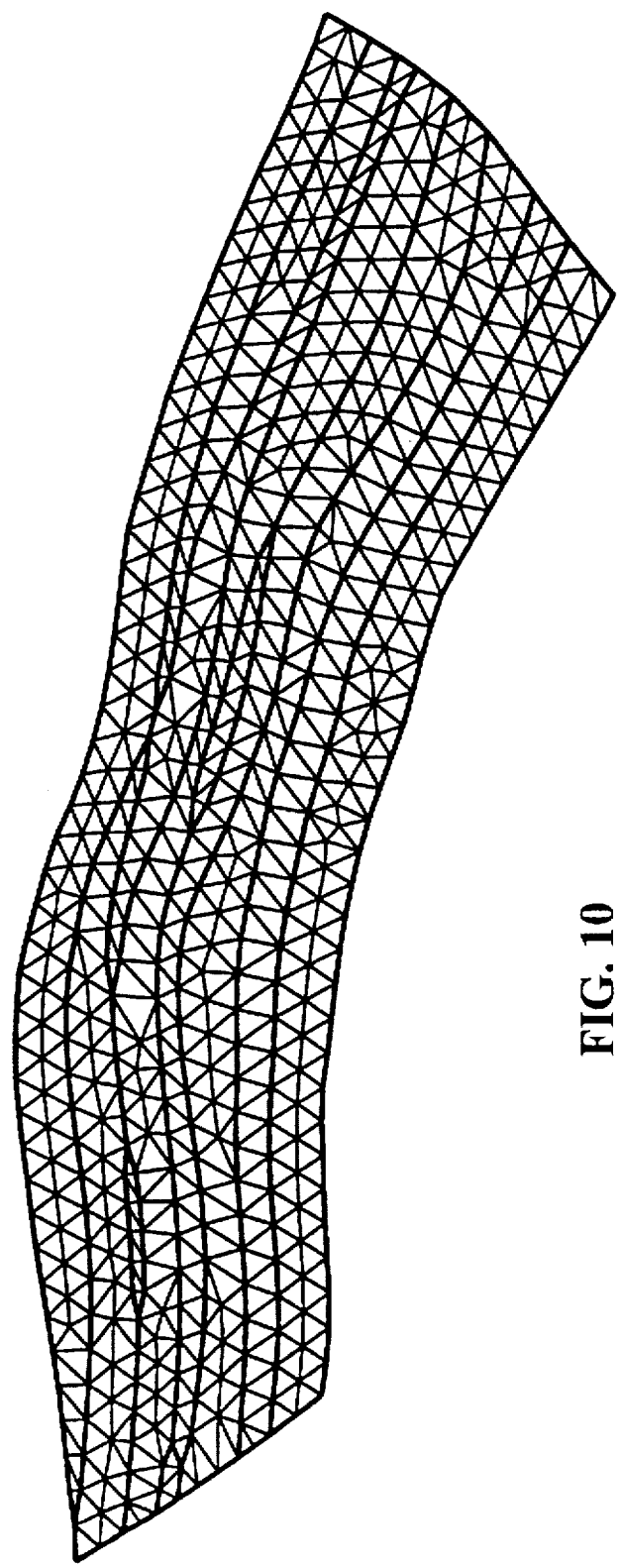
FIG. 10 illustrates the resulting triangulation on the fault surface.

After the triangulation is done, all triangles are checked for violations of the Delaunay circumsphere property. If there is a violation, it is fixed by diagonal swapping. Then the grid is smoothed using a Laplacian technique and the circumsphere property test is applied again. This process is repeated twice. In this way, all faces of all regions are triangulated. FIG. 10 shows the resulting triangles on the fault surface.

The main purpose of the triangulation is to create the interior nodal distribution of the faces and to help define internal constraints of the domain. Because the tetrahedronization process determines the surface triangulation, the triangles in this operation 400 are not directly used as the bases of the tetrahedrons to be generated.

Tetrahedronization of Regions (500)

The domain then is tetrahedronized, in this operation 500, region by region to create the finite-element grid which will be connected to the remaining finite-difference grid created in operations 100 and 200. The tetrahedronization is done similarly to the standard advancing front technique. The process, however, is simplified because each region is like a narrow channel which enables the interior nodes to be created a priori by a simple process. The interior nodes of both the top and bottom faces of each region are projected half way to the opposite face. A new interior node for the region is created if the node is not within a predetermined distance of the existing faces and nodes. The tetrahedronization is done similarly to the standard advancing front technique. The process, however, is simplified because the interior nodes are defined a priori. After a region is tetrahedronized, the surface triangulation of the region is replaced by the triangles dictated by the surfaces of the tetrahedrons.

If the region to be tetrahedronized has a common interface with a previously tetrahedronized region, all the triangles on the common interface are accumulated on a tetrahedronization generation front. Otherwise, one of the existing surface triangles is used as the front. The nodes of the face segments are ordered such that their normal points inward to the region. The face segments on the generation front are sorted in order of the decreasing radii of their inscribed circles.

The first (or next) face segment on the generation front is used as a base to make a heap list of the nodes that are located to the left of the base and within a radius of three times the average grid size from the center of the base. If the tetrahedron to be created with the considered node crosses the active generation front or a region boundary, the considered node is not included in the heap list. All nodes in the heap list are candidates for the fourth node of the tetrahedron to be generated. The nodes are ordered in order of decreasing aspect ratio.

If there is a candidate in the heap list which would not create any new face segment in the generation front, it is accepted as the fourth node. If not, but there is a node in the heap list that if used would create a tetrahedron with a circumsphere that would not contain any of the other nodes in the heap list, then this node is accepted as the fourth node. If not, but there is a node in the heap list that if used would create a tetrahedron that would not contain any of the other nodes in the heap list, then this node is accepted as the fourth node. If not, then the next face segment on the generation front is used as a base and the process is repeated until a fourth node is found.

A new tetrahedron is created using the fourth node. The base face segment is removed from the active generation front. There now are potentially three new face segments. If a new face segment matches an existing face segment, the matching face segment is removed from the generation front. If there is no match, the new face segment is added to the generation front.

If the removal of a matching face segment results in the emptying of the generation front, tetrahedronization is complete. If a removal does not empty the generation front, the generation front is resorted and the procedure is repeated.

Figure 11B:
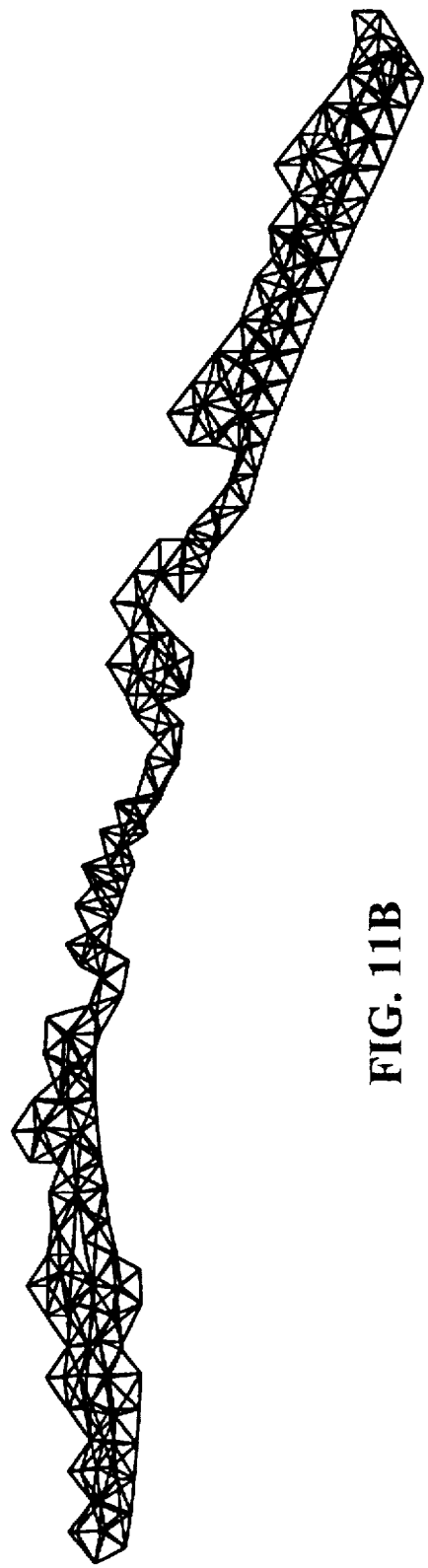
Figure 11C:
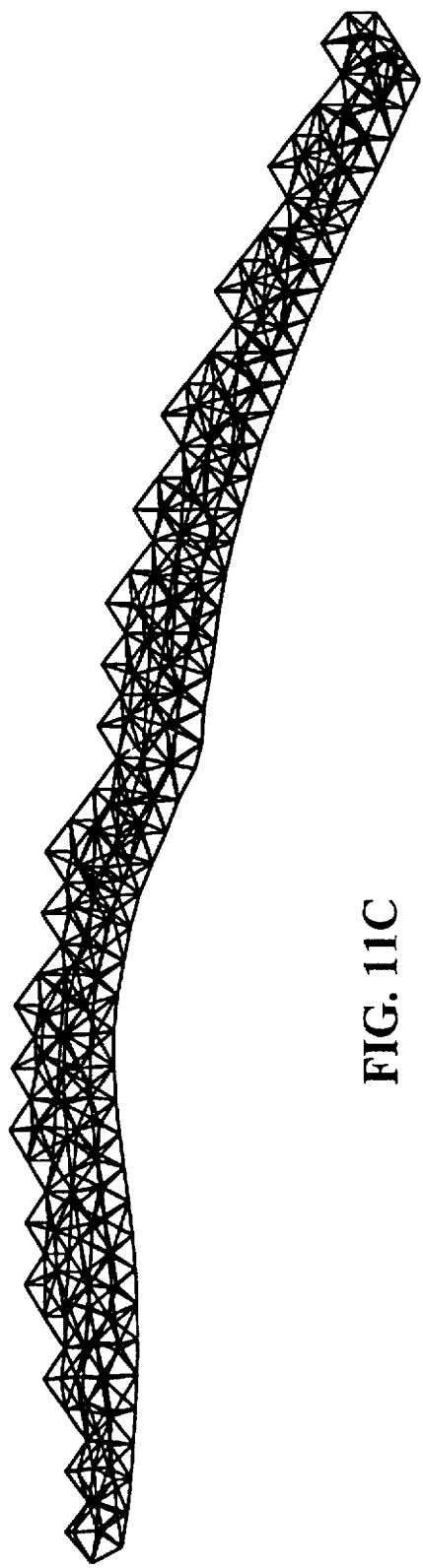
Figure 11D:
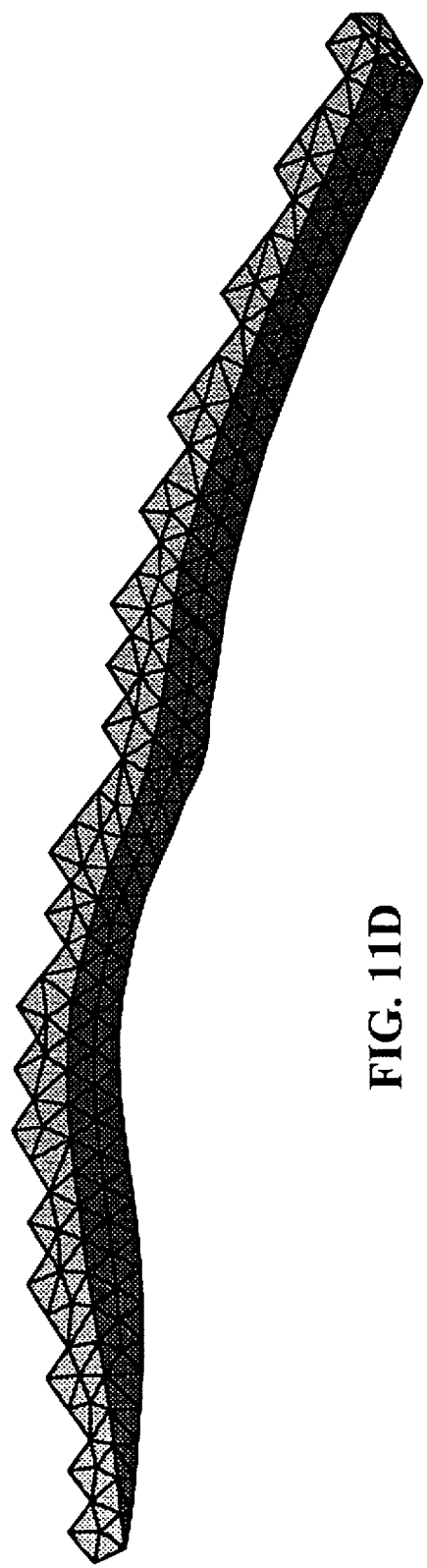

The results of the tetrahedronization procedure are illustrated in FIGS. 11A–D. FIG. 11A illustrates the wire-frame structure of one of the regions to be tetrahedronized. FIG. 11B shows the region partially filled with tetrahedrons. Because the order of tetrahedronization is controlled by the smallest face segment on the active generation front and not by the relative locations of the face elements, the process looks somewhat random. FIG. 11C shows the region completely filled by tetrahedrons. After the tetrahedronization is completed, the grid is smoothed using a Laplacian technique which is well-known in the industry. FIG. 11D shows the surface triangulation of the region dictated by tetrahedrons.

Assembly of the Grid (600)

Figure 12:
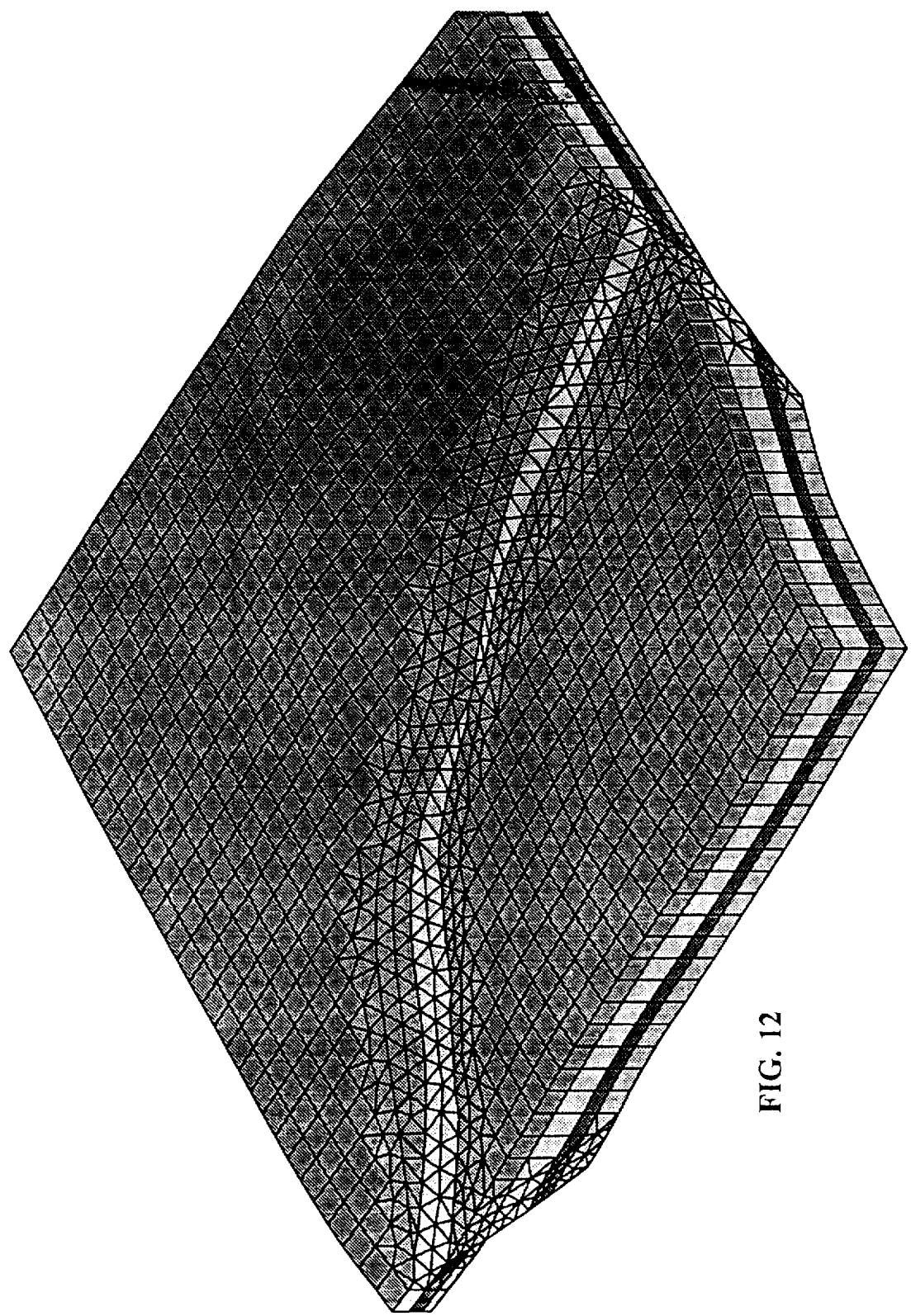
FIG. 12 is a perspective view of the locally-unstructured hybrid grid for the FIG. 2 reservoir.

As shown in FIG. 12, the finite-element tetrahedrons that constitute the grid for each region (the finite-element grid) are combined with the retained part of the finite-difference grid (hexahedrons) which improves the precision of the model while minimizing the computational effort required for reservoir simulation. The hybrid grid more accurately preserves the geometry and topology of the layers around the fault, as illustrated in FIG. 3C, and does not distort the fluid communication properties through the fault.

The resultant locally-unstructured grid can be displayed, printed and/or plotted for use by the reservoir engineer. Additionally, the grid, with its discretized data structure, is input to a reservoir simulation program to determine the flow characteristics of the reservoir. The significance of the invention becomes more apparent during this process. Because the data created by the method of the present invention has minimal unstructured portions, the data is processed with little additional computing time; and because the complex portion of the reservoir has the additional accuracy of the unstructured finite element grid, the flow characteristics have better accuracy.

Figure 13:
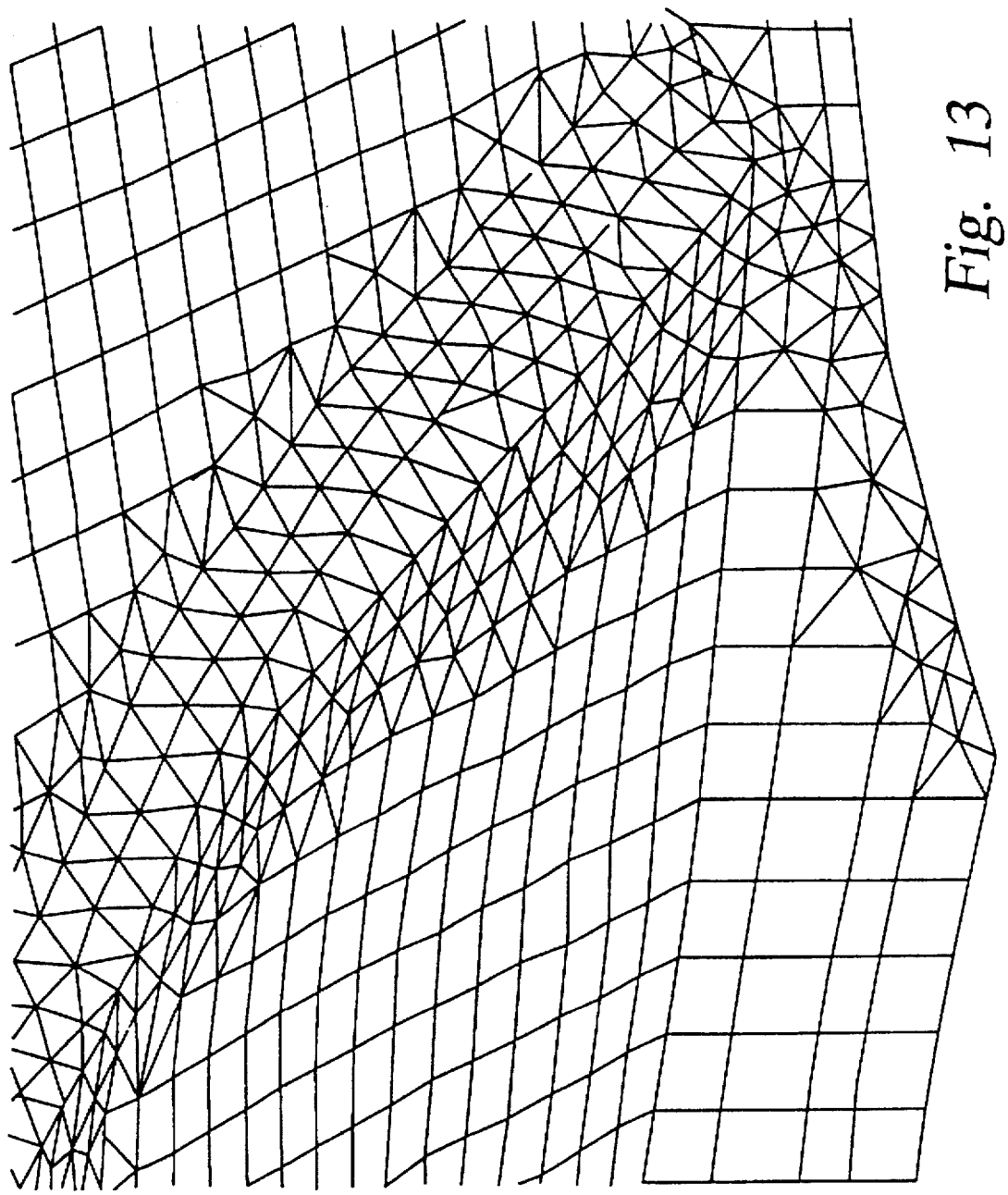
FIG. 13 is an enlarged view of FIG. 12.
Figure 14:
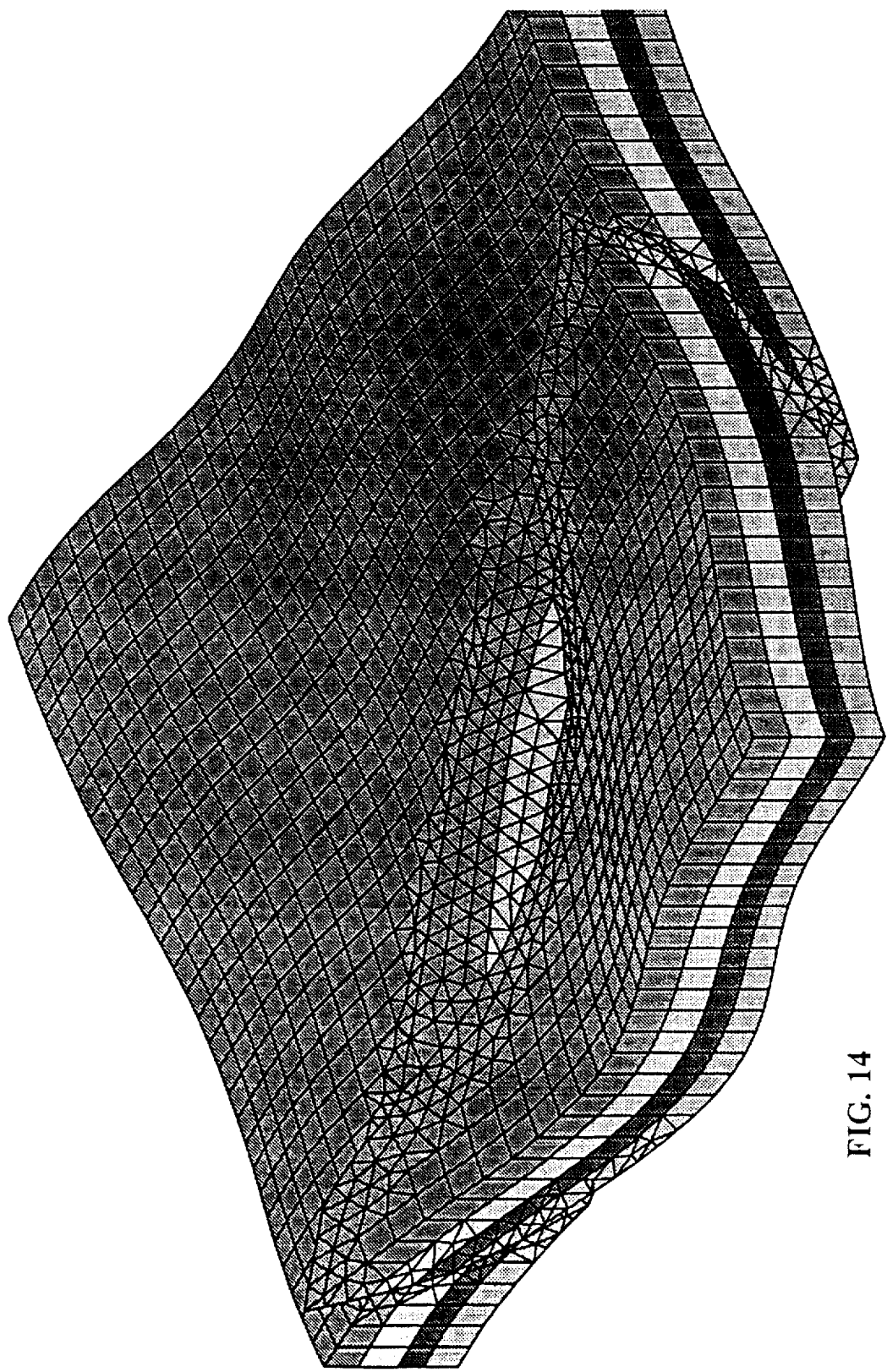
FIG. 14 is a perspective view of a locally-unstructured hybrid grid for a reservoir with a scissors fault.
Figure 15:
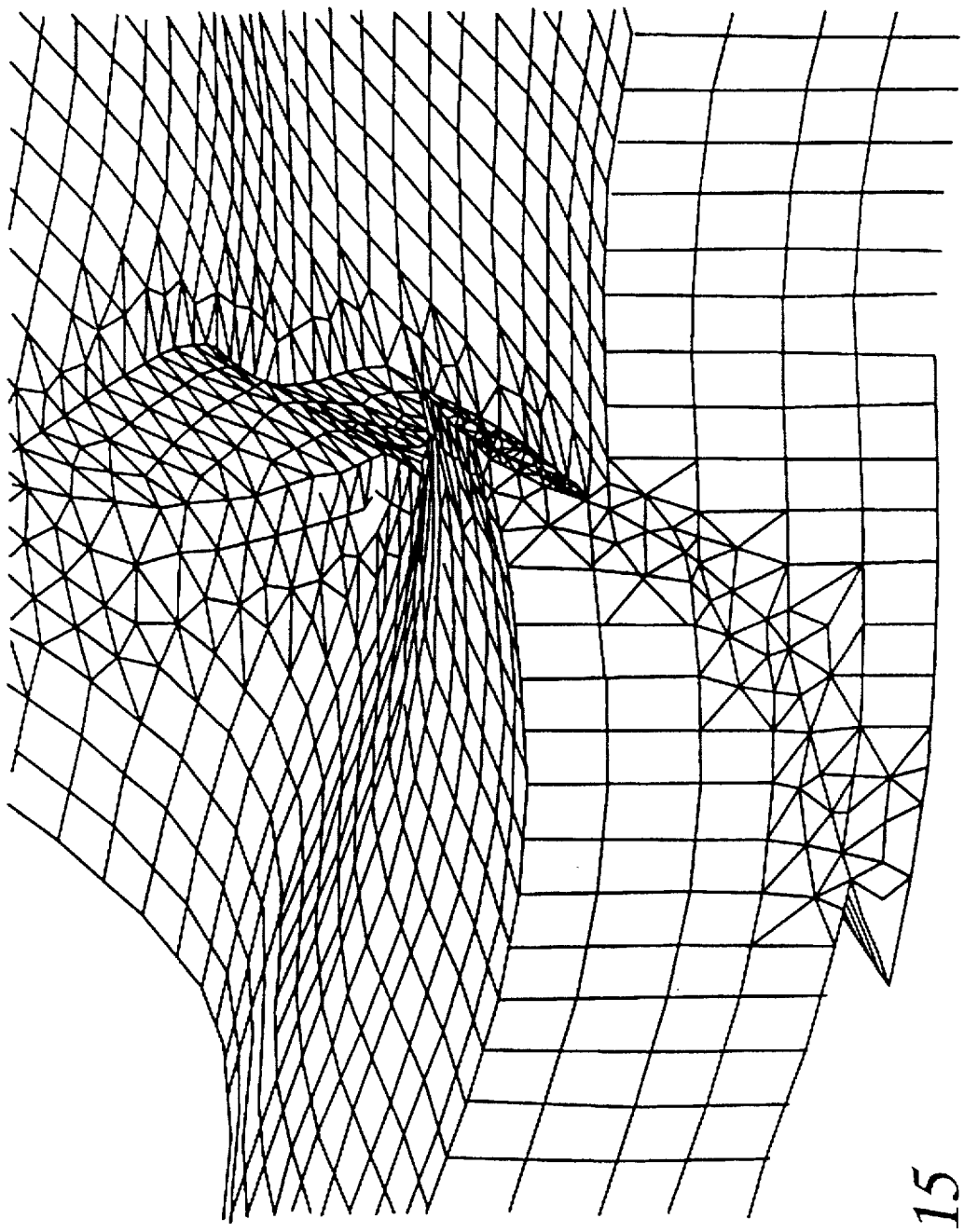
FIG. 15 is an enlarged view of the grid shown in FIG. 14.

FIG. 13 is an enlarged, perspective view of the grid around the sloping fault. FIG. 14 illustrates another hybrid grid that is obtained from this grid generation system for a reservoir with a scissors fault. FIG. 15 shows a close up perspective of one of the reversed fault sections of the reservoir shown in FIG. 14.

The foregoing description is directed to a preferred embodiment of the present invention for the purpose of illustration and explanation. It will be apparent, however, to one skilled in the art that modifications and changes to the embodiment set forth above are possible without departing from the scope of the invention. It is intended that the following claims be interpreted to embrace all such modifications and changes.

I claim:

1. An improved method of simulating the physical structure of an earth formation to show complex geometry around a fault, comprising:

(a) entering formation data into a computer system, wherein the formation data includes the physical location and structure of the fault and horizons of the formation;

(b) transforming the formation data into a three-dimensional, structured finite-difference grid of hexahedrons;

(c) identifying regions at the intersections of the fault with the horizons and removing the hexahedrons in the identified regions from the structured grid;

(d) decomposing the identified regions around the fault into topologically and geometrically simple volume, face and line components;

(e) generating volume nodes for the volume components of the identified regions by an automatic process comprising the steps of:
        (1) generating line nodes along the line components of the identified regions,
        (2) generating a two-dimensional finite-element grid for the face components of the identified regions using an automatic triangulation process on the line nodes,
        (3) generating interior volume nodes for the volume components from face nodes of the two-dimensional finite-element grid, and
        (4) combining the face nodes and interior volume nodes;

(f) generating a three-dimensional, unstructured finite-element grid for the volume components of the identified regions using an automatic tetrahedronization process on the volume nodes; and (g) combining the unstructured grid of tetrahedrons with the remainder of the structured grid of hexahedrons to form a three-dimensional, locally-unstructured hybrid grid.

2. The method of claim 1, wherein the hexahedron removal step further comprises:

(i) determining the intersection of the fault with the horizons of the formation; and (ii) removing the hexahedrons from the finite-difference grid that either cross the fault or are within a threshold distance of the fault.

3. The method of claim 1, wherein the triangulation and tetrahedronization steps are a modified form of the advancing front technique.

4. The method of claim 3, wherein the triangulation and tetrahedronization steps use Delaunay triangulation to select optimum triangles and tetrahedrons.

5. The method of claim 4, wherein the grids generated by the triangulation and tetrahedronization steps are smoothed by a Laplacian technique.

6. The method of claim 1, wherein the identified regions are defined for each layer between the horizons on each side of the fault.

7. The method of claim 6, wherein the identified regions are defined as a portion of the layer between the horizons, which portion is surrounded by a boundary of the finite-difference grid, the remaining hexahedrons of the finite-difference grid, and the fault.

8. The method of claim 7, wherein the generating the interior volume nodes step comprises the steps of:

selecting the face nodes of the top and bottom face components of each identified region which are not on line components;

projecting the selected face nodes halfway to the opposite face component of the identified region; and retaining the projected nodes which are greater than a predetermined distance from face components and other interior volume nodes.

9. The method of claim 1, wherein the generating line nodes step comprises the steps of:

setting the spacing of the line nodes on line components which match the remainder of the finite-difference grid to the spacing of the nodes of the finite-difference grid; and setting the spacing of the line nodes on remaining line components to sixty percent of average finite-difference grid hexahedron size.

* * * * *